(12) United States Patent
Greenwood et al.

(10) Patent No.: US 7,674,833 B2
(45) Date of Patent: Mar. 9, 2010

(54) COMPOSITION PREPARED FROM SILICA SOL AND MINERAL ACID

(75) Inventors: Peter Greenwood, Gothenburg (SE); Hans Lagnemo, Gothenburg (SE); Matthew Reed, Marietta, GA (US)

(73) Assignee: Akzo Nobel N.V., Arnhem (NL)

( * ) Notice: Subject to any disclaimer, the term of this patent is extended or adjusted under 35 U.S.C. 154(b) by 319 days.

(21) Appl. No.: 10/541,026

(22) PCT Filed: Nov. 9, 2004

(86) PCT No.: PCT/SE2004/001635
§ 371 (c)(1), (2), (4) Date: Jul. 24, 2006

(87) PCT Pub. No.: WO2005/050770
PCT Pub. Date: Jun. 2, 2005

(65) Prior Publication Data
US 2006/0263694 A1    Nov. 23, 2006

(30) Foreign Application Priority Data
Nov. 21, 2003 (EP) ................... 03445134

(51) Int. Cl.
C01B 33/141 (2006.01)
H01M 10/10 (2006.01)
(52) U.S. Cl. ........................ 516/82; 429/302
(58) Field of Classification Search ................ 429/302; 423/338; 516/82, 81
See application file for complete search history.

(56) References Cited

U.S. PATENT DOCUMENTS

| | | | |
|---|---|---|---|
| 2,630,410 A | 3/1953 | Clapsadle et al. | |
| 5,368,833 A | 11/1994 | Johansson | |
| 5,663,321 A | 9/1997 | Gmeiner | |
| 5,664,321 A * | 9/1997 | Sielemann et al. | 429/302 X |
| 5,780,005 A * | 7/1998 | Olerud | 423/335 |
| 6,372,806 B1 * | 4/2002 | Keiser et al. | 516/82 |
| 2001/0004927 A1 * | 6/2001 | Greenwood et al. | 516/83 X |
| 2002/0147240 A1 * | 10/2002 | Persson et al. | 516/78 |

FOREIGN PATENT DOCUMENTS

| | | |
|---|---|---|
| CN | 1056019 | 11/1991 |
| DE | 3324740 | 1/1984 |
| EP | 0537373 | 4/1993 |
| EP | 0736922 | 10/1996 |
| JP | 05047410 A | 2/1993 |
| WO | WO 9107350 | 5/1991 |
| WO | WO 9405596 | 3/1994 |
| WO | WO 9507235 | 3/1995 |
| WO | WO 0066491 | 11/2000 |

OTHER PUBLICATIONS

International Search Report, completed Mar. 22, 2005, 9 pages.
European Search Report, completed May 4, 2004, 10 pages.
Written Opinion, 6 pages.
Iler, K. Ralph, The Chemistry of Silica, John Wiley & Sons (1979), pp. 482-487.
Sears, Journal of Analytical Chemistry, vol. 28, No. 12, Dec. 1956, pp. 1981-1983.
Iler, K. Ralph, The Chemistry of Silica, John Wiley & Sons (1979), pp. 407-409.
Iler, K. Ralph et al, J. Phys. Chem. 60(1956), pp. 955 957.
English language translation of the Japanese Office Action dated Oct. 27, 2009 for the Japanese Application No. 2005-541081.
Patent Abstracts of Japan for JP-05-47410.(doc date Feb. 1993).
Computer-generated English translation for JP-05-47410. (doc date Feb. 1993).
Patent Abstracts of Japan for JP-57-148882. (doc date Sep. 1982).

* cited by examiner

*Primary Examiner*—Stephen J. Kalafut
(74) *Attorney, Agent, or Firm*—Robert C. Morriss; David J. Serbin

(57) ABSTRACT

The present invention relates to a method of preparing a composition comprising mixing a silica sol having an S-value from about 5 to about 50% and a mineral acid. The invention also relates to a composition obtainable by the method and a composition comprising a network of silica particles and mineral acid, wherein the silica particles have a particle size of from about 2 to about 7 nm. The invention also relates to the use of the composition as a gelled electrolyte.

12 Claims, No Drawings

COMPOSITION PREPARED FROM SILICA SOL AND MINERAL ACID

This application claims priority from International Application No. PCT/SE2004/001635, filed on Nov. 9, 2004, which claims priority from European Application No. 03445134.4, filed on Nov. 21, 2003, the subject matter of which is incorporated herein by reference.

The present invention relates to a composition suitable for use as battery electrolyte, pickling gel, or binder of waste material, and a method of providing the composition.

BACKGROUND OF THE INVENTION

It is known in the art to provide battery electrolytes by mixing a gelling agent with sulphuric acid. The electrolyte is in the form of a thixotropic gel which as essential constituents includes sulphuric acid and a gel-forming agent which may be e.g. a silica sol as proposed in U.S. Pat. No. 5,663,321. This type of gelled electrolyte involves several advantages over non-gelled liquid electrolytes such as the possibility of independent positioning while being substantially free of leaking and maintenance. However, the electrolyte disclosed in U.S. Pat. No. 5,663,321 lacks sufficient gel strength and the time of gelling is often too long.

The present invention intends to provide a gelled composition which solves the above problems in batteries, and which also may be used for other applications.

THE INVENTION

The present invention relates to a method of preparing a composition comprising mixing a silica sol having an S-value from about 5 to about 50% and a mineral acid.

It has been found that the composition of this invention when applied as a gelled electrolyte in e.g. lead-acid batteries results in longer service life, shorter gelling time, and improved gel strength. When the silica sol and mineral acid have been mixed, gelling will take place. This is due to the fact that the colloidal silica particles present in the silica sol will form siloxane bridges between each other in the presence of the mineral acid which leads to aggregation and gelling thereof.

According to a preferred embodiment, the silica sol has an S-value from about 8 to about 47, preferably from about 10 to about 45, even more preferably from about 15 to about 45, even more preferably from about 25 to about 43, and most preferably from about 30 to about 40%.

It has been found that an S-value within these ranges can optimise the mentioned advantages. The S-value characterises the extent of aggregation of colloidal silica particles, i.e. the degree of aggregate or microgel formation. The S-value has been measured and calculated according to the formulas given in "Degree of hydration of particles of colloidal silica in aqueous solution", J. Phys. Chem. 60(1956), 955-957 by Iler, R. K. & Dalton, R. L.

The S-value depends on the silica content, the viscosity, and the density of the colloidal silica particles. The S-value represents the amount of $SiO_2$ in percent by weight present in the dispersed phase of the silica sol. The S-value can be controlled during the production process as further described in e.g. U.S. Pat. No. 5,368,833.

The silica sol preferably has a silica content from about 5 to about 60, more preferably from about 7 to about 45, and most preferably from about 10 to about 30 wt %. The silica sol comprises silica particles which suitably have a specific surface area from about 400 to about 1200, preferably from about 500 to about 1000, and most preferably from about 600 to about 900 $m^2/g$. The silica particles suitably have a particle size of from about 2.5 to about 7, preferably from about 3 to about 6, and most preferably from about 4 to about 5 nm. Suitably, the silica sol and the mineral acid are mixed in a weight ratio of silica to mineral acid (counted as diluted mineral acid) from about 1:100 to about 25:100, preferably from about 2:100 to about 11:100, more preferably from about 2.5:100 to about 8:100, and most preferably from about 3:100 to about 6:100. The components are preferably homogenously mixed to uniformly distribute the silica particles of the silica sol in the electrolyte.

Silica sols comprise colloidal silica particles which may be derived from e.g. precipitated silica, micro silica (silica fume), pyrogenic silica (fumed silica) or silica gels with sufficient purity, and mixtures thereof.

Colloidal silica particles and silica sols according to the invention may depending on the application of the composition be modified and can contain other elements such as amines, aluminium and/or boron, which can be present in the particles and/or the continuous phase. Boron-modified silica sols are described in e.g. U.S. Pat. No. 2,630,410. The aluminium modified silica particles suitably have an $Al_2O_3$ content of from about 0.05 to about 3, preferably from about 0.1 to about 2 wt %. The procedure of preparing an aluminium modified silica sol is further described in e.g. "The Chemistry of Silica", by Iler, K. Ralph, pages 407-409, John Wiley & Sons (1979) and in U.S. Pat. No. 5,368,833.

The colloidal silica particles preferably have a narrow particle size distribution, i.e. a low relative standard deviation of the particle size. The relative standard deviation of the particle size distribution is the ratio of the standard deviation of the particle size distribution to the mean particle size by numbers. The relative standard deviation of the particle size distribution preferably is lower than about 60% by numbers, more preferably lower than about 30% by numbers, and most preferably lower than about 15% by numbers.

The colloidal silica particles are suitably dispersed in an aqueous solvent, suitably in the presence of stabilising cations, preferably $K^+$, $Na^+$, $Li^+$ for battery electrolyte applications, but for other applications also e.g. $NH_3$, organic cations, primary, secondary, tertiary, and quaternary amines, or mixtures thereof so as to form an aqueous silica sol. However, also dispersions comprising organic solvents e.g. lower alcohols, acetone or mixtures thereof may be used for applications other than battery electrolytes, suitably in an amount of from about 1 to about 20, preferably from about 1 to about 10, and most preferably from about 1 to about 5 volume percent of the total solvent volume. However, aqueous silica sols without any further solvents are preferably used. The pH of the silica sol suitably is from about 1 to about 13, preferably from about 6 to about 12, and most preferably from about 7.5 to about 11. However, for aluminium-modified silica sols, the pH suitably is from about 1 to about 12, preferably from about 3.5 to about 11. Preferably, the silica sol has an iron content lower than about 100 ppm by weight since iron may cause discharge of batteries in which the composition of this invention may be used and can shorten battery life times. More preferably, the iron content is lower than about 50, and most preferably lower than about 30 ppm by weight. Preferably, the content of chloride in the silica sol is lower than about 50, more preferably lower than about 30, and most preferably lower than about 10 ppm by weight. The low chloride content is essential in the formed composition (in battery applications) since grid corrosion, i.e. corrosion of the lead grid in the battery then can be reduced. Other impurities present in the composition that can be detrimental and their acceptable levels should not exceed prescribed limits.

Preferably, the mineral acid, which serves as electrolyte, is hydrochloric acid, nitric acid, phosphoric acid, sulphuric acid, and mixtures thereof, most preferably sulphuric acid, particularly for any battery application. The concentration of the mineral acid, especially sulphuric acid, suitably is from about 5 to about 99, preferably from about 20 to about 80, and most preferably from about 30 to about 60 wt %. A too low concentration will result in a bad electrolyte (with low conductivity) and long gel time. Suitably, the pH of the mineral acid is from about −2 to about 2, preferably from about −1.5 to about 1, more preferably from about −1 to about 0.5, and most preferably from about −0.5 to about 0. A suitable concentration of the mineral acid can be achieved by diluting a concentrated mineral acid with water. Suitably, sulphuric acid (as used mineral acid) has a density from about 1.04 to about 1.8, preferably from about 1.15 to about 1.75, more preferably from about 1.2 to about 1.5, and most preferably from about 1.3 to about 1.4 $kg/dm^3$.

Preferably, the mixing of silica sol and mineral acid is performed at a temperature from about 0 to about 95, preferably from about 5 to about 50, and most preferably from about 10° C. to about 35° C. Dilution of sulphuric acid and other mineral acids often leads to an increase in temperature due to the exothermic reaction taking place. Therefore, the diluted acid used preferably is precooled to a temperature below room-temperature. The mixing time of silica sol and mineral acid suitably is from about 100 milliseconds to about 30 minutes, preferably from about 100 milliseconds to about 10 minutes, and most preferably from about 100 milliseconds to about 1 minute. The silica sol and the mineral acid preferably are mixed in an in-line mixer, e.g. a static mixer, just before filling it into a battery cell or other use. A too long mixing time is detrimental to the gel strength while a too short mixing time may lead to insufficient mixing.

Further components which may be added to form the composition of the present invention include orthophosphoric acid, suitably to a concentration of from about 1.5 to about 5% by weight with respect to the total weight of the forming composition (gel) in order to increase the conductivity as well as the cycle and discharge resistance of a battery.

Sodium sulphate may also be added in an amount of from about 1 to about 25, preferably from about 2 to about 12 g sodium sulphate/l of composition (electrolyte) in order to lower the solubility of lead sulphate in a battery cell. Aluminium hydroxide may also be added, preferably in an amount of from about 0.1 to about 0.5 wt % based on aluminium oxide. Other suitable additives that can be added include such as mentioned in U.S. Pat. No. 6,218,052 to enhance battery performance. These components may be added either directly to the mixture of silica sol and mineral acid, or to either the mineral acid or silica sol directly before mixing thereof.

The invention also relates to a composition obtainable by the method as defined herein.

The invention also relates to a composition comprising a network of silica particles, in which the size of the (primary) silica particles making up the network, i.e. the particle size of a silica particle as single silica particle, is from about 2 to about 7, more preferably from about 3 to about 6, and most preferably from about 4 to about 5 nm. The composition further comprises a mineral acid as described herein. The size of the primary silica particle can be determined by the specific surface as measured by titration according to Sears (Journal of Analytical Chemistry, Volume 28, no. 12, December 1956). However, the specific surface area measured by the technique described in Sears will be slightly underestimated since a portion of the surface of the silica particle is occupied by bonds/bridges to neighbouring silica particles in the network. The correction between the specific surface area of a primary particle and measured surface area of the gel is further discussed in The Chemistry of Silica (1979), p. 482 to p. 487, by Ralph K. Iler. The silica particles comprised in the composition suitably have a specific surface area from about 200 to about 1100, preferably from about 300 to about 1000, more preferably from about 400 to about 900, and most preferably from about 500 to 800 $m^2/g$. The weight ratio of silica to mineral acid (counted as diluted mineral acid), in the network of silica, is suitably from about 1:100 to about 25:100, preferably from about 2:100 to about 11:100, more preferably from about 2.5:100 to about 8:100, and most preferably from about 3:100 to about 6:100. The silica content of the composition suitably is from about 1 to about 20, preferably from about 2 to about 10, more preferably from about 2.5 to about 7.5, and most preferably from about 3 to about 6 wt %. A low silica content in the gel will result in lower internal resistance, and thus higher capacity as e.g. a gelled electrolyte in a battery. Preferably, the average pore diameter of the silica particles in the composition formed is from about 1 nm to about 100 nm, more preferably from about 5 nm to about 50 nm, and most preferably from about 10 nm to about 30 nm. Preferably, the pore volume of the silica particles in the composition is from about 0.4 to about 55, more preferably from about 1 to about 35, and most preferably from about 5 to about 20 $cm^3/g$ silica.

The invention also relates to the use of the composition as herein disclosed as a gelled electrolyte in traction batteries in e.g. submarines, wheelchairs, industrial trucks, and transport vehicles on golf courts; stand-by batteries in e.g. solar energy plants and telecommunication masts; and automotive batteries in e.g. start batteries and batteries for car electronics. These three groups of applications differ in their needs of battery capacity. Generally, it can be said that traction batteries need high capacity during a fairly long period of time, automotive batteries need very high capacity during a short period of time, and stand-by batteries need fairly low capacity during a long period of time.

The composition may also be used as a pickling gel, a binder of waste material, as an acid cleaning gel for surfaces and cavities and any other application where a gelled composition is desirable.

The invention being thus described, it will be obvious that the same may be varied in many ways. Such variations are not to be regarded as a departure from the gist and scope of the present invention, and all such modifications as would be obvious to one skilled in the art are intended to be included within the scope of the claims. While the examples here below provide more specific details of the reactions, the following general principles may here be disclosed. The following examples will further illustrate how the described invention may be performed without limiting the scope of it.

All parts and percentages refer to part and percent by weight, if not otherwise stated.

EXAMPLES

The silica sols used in the examples are listed in table 1 below.

TABLE 1

| | Silica sol | | |
|---|---|---|---|
| | 1 (invention) | 2 (reference) | 3 (reference) |
| Specific surface area (m²/g) | 769 | 361 | 295 |
| pH | 10.5 | 10 | 10.5 |
| Density (kg/dm³) 20° C. | 1.1 | 1.21 | 1.21 |
| Silica Content (wt %) | 14.9 | 30.3 | 30.1 |
| Viscosity (cP) | 8.2 | 7.0 | 8.6 |
| S-value, ller-Dalton (%) | 33 | 96 | 52 |

The compositions of table 2 were prepared by use of the silica sols of table 1: The procedure of obtaining the composition of the invention and the references was the following (which also can be found in table 2):

a) The concentrated sulphuric acid was diluted with water in a 250 ml beaker and cooled to room temperature.

b) The silica sols were mixed with the diluted sulphuric acid.

c) The temperature was measured in the silica sol-sulphuric acid mixture by means of a glass thermometer.

d) The gel time, i.e. the period of time from the starting point of mixing the silica sol and the mineral acid until a solid gel is obtained that does not flow when the beaker is tilted 90°.

TABLE 2

| Composition No. | Conc. Sulphuric acid | H₂O | Silica Sol No. | Silica sol added (g) | Wt % SiO₂ | Gel time (min) | Temp. (exotherm reaction (° C.) | Gel time (isotherm reaction at 20° C. (min) | Total surface area of silica particles in m²/g of composition |
|---|---|---|---|---|---|---|---|---|---|
| 1 | 100 g | 112 g | 2 | 53 | 6 | 62 | 27 | 101 | 21.6 |
| 2 | 100 g | 94.3 g | 2 | 70.7 | 8 | 32 | 29 | 60 | 28.8 |
| 3 | 100 g | 112 g | 3 | 53 | 6 | 48 | 27 | 78 | 17.7 |
| 4 | 100 g | 94.3 g | 3 | 70.7 | 8 | 17 | 30 | 34 | 23.6 |
| 5 | 100 g | 112 g | 1 | 53 | 3 | 17 | 28 | 30 | 22.5 |
| 6 | 100 g | 94.3 g | 1 | 70.7 | 4 | 8 | 30 | 16 | 30 |

The gel time at 20° C. is a normalisation of the gel time at a temperature T at which the gelling took place. The gelling time at 20° C. can be calculated from the formula: Gel time (T=20° C.)=Gel time (at T ° C.)*$2^{(T-20)/10}$, where T is the temperature in ° C. As can be seen from table 2, the gel time is much shorter for samples 5 and 6 according to the present invention than the reference samples 1-4, both at reaction at the actual temperature and at the calculated temperature of 20° C.

The gel strength was measured 24 hours after the formation of the gelled electrolyte. The gel strength was tested by dropping a lead bullet with a weight of 0.5 g, a diameter of 4.4 mm, from a height of 23 cm. The impact is shown in table 3 as penetration depth in mm in the gel which is a good measure of the gel strength.

TABLE 3

| Composition no | Depth (mm) |
|---|---|
| 1 | 8 |
| 2 | 1 |
| 3 | 8 |
| 4 | 1 |
| 5 | 1 |
| 6 | 0 (bounce) |

It can be clearly seen that the compositions of the invention, i.e. no. 5 and 6, show increased gel strength compared to the references 1-4. It is to be noted that compositions 5 and 6 comprise a lower amount of silica than compositions 1-4. Thus, the composition according to the invention can improve the mentioned effects even at a lower dosage of silica sol than the references.

The invention claimed is:

1. Method of preparing a composition comprising mixing a silica sol having an S-value from about 15 to about 45% and a mineral acid, wherein the weight ratio of silica to mineral acid is from about 1:100 to about 25:100.

2. Method according to claim 1, wherein the S-value is from about 15 to about 40%.

3. Method according to claim 1, wherein the S-value is from about 15 to about 35%.

4. Method according to claim 1, wherein the silica sol has a specific surface area from about 400 to about 1200 m²/g.

5. Method according to claim 1, wherein the silica sol has a specific surface area from about 500 to about 1000 m²/g.

6. Method according to claim 1, wherein the silica sol has a specific surface area from about 600 to about 900 m²/g.

7. Method according to claim 1, wherein the mineral acid is sulphuric acid.

8. Method according to claim 1, wherein the mineral acid is hydrochloric acid, nitric acid, phosphoric acid, and mixtures thereof.

9. Method according to claim 1, wherein orthophosphoric acid and/or sodium sulphate is further added.

10. Method according to claim 1, wherein the content of chloride in the silica sol is lower than about 50 ppm by weight.

11. Method according to claim 1, wherein the mineral acid has a pH ranging from about −2 to about 2.

12. Method according to claim 11, wherein the mineral acid has a pH ranging from about −1.5 to about 1.

* * * * *

UNITED STATES PATENT AND TRADEMARK OFFICE
CERTIFICATE OF CORRECTION

PATENT NO. : 7,674,833 B2  
APPLICATION NO. : 10/541026  
DATED : March 9, 2010  
INVENTOR(S) : Peter Greenwood et al.

It is certified that error appears in the above-identified patent and that said Letters Patent is hereby corrected as shown below:

Title Page, Item

(75) Inventors: "Peter Greenwood, Gothenburg (SE);"

"Hans Lagnemo, Gothenburg (SE);"

Matthew Reed, Marietta, GA (US)

should read -- Peter Greenwood, Goteborg (SE); --

-- Hans Lagnemo, Goteborg (SE); --

Matthew Reed, Marietta, GA (US)

Signed and Sealed this
Twenty-eighth Day of June, 2011

David J. Kappos
*Director of the United States Patent and Trademark Office*